(12) United States Patent
Song et al.

(10) Patent No.: US 12,328,144 B2
(45) Date of Patent: Jun. 10, 2025

(54) PHOTONIC MULTI-BAND FILTER AND METHOD OF OPERATING SAME

(71) Applicant: ELECTRONICS AND TELECOMMUNICATIONS RESEARCH INSTITUTE, Daejeon (KR)

(72) Inventors: Minhyup Song, Daejeon (KR); Hyun Jong Choi, Daejeon (KR); Minje Song, Daejeon (KR); Gyu Dong Choi, Daejeon (KR); Taehyun Lee, Daejeon (KR); Seungyoung Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 154 days.

(21) Appl. No.: 18/081,789

(22) Filed: Dec. 15, 2022

(65) Prior Publication Data

US 2023/0283375 A1     Sep. 7, 2023

(30) Foreign Application Priority Data

Mar. 2, 2022    (KR) ........................ 10-2022-0026868
Nov. 4, 2022    (KR) ........................ 10-2022-0146032

(51) Int. Cl.
     *H04B 10/2575*      (2013.01)
     *H04B 10/548*      (2013.01)

(52) U.S. Cl.
     CPC ....... *H04B 10/2575* (2013.01); *H04B 10/548* (2013.01)

(58) Field of Classification Search
None
See application file for complete search history.

(56) References Cited

U.S. PATENT DOCUMENTS

| 4,530,084 A | 7/1985 | Strebel et al. |
| 7,085,499 B2 * | 8/2006 | Yap .................. H04B 10/2575 |
| | | 398/186 |

(Continued)

FOREIGN PATENT DOCUMENTS

| JP | 2014-157291 A | 8/2014 |
| KR | 10-1144301 B1 | 5/2012 |
| KR | 10-2013-0118384 A | 10/2013 |

OTHER PUBLICATIONS

Yuan Yu et al., "Single Passband Microwave Photonic Filter With Continuous Wideband Tunability Based on Electro-Optic Phase Modulator and Fabry-Perot Semiconductor Optical Amplifier", Journal of Lightwave Technology, vol. 29, No. 23, Dec. 1, 2011.

*Primary Examiner* — Jai M Lee
(74) *Attorney, Agent, or Firm* — LRK PATENT LAW FIRM (57) ABSTRACT

Disclosed are a photonic multiband filter and a method of operating the same. The photonic multiband filter includes an optical frequency comb that forms multiple optical channels based on a single light source incident from an outside, a modulator that applies an RF signal modulated into an optical domain among a plurality of RF signals to the multiple optical channels, and a pulse shaper that determines a center frequency, a bandwidth, and a passband shape of the RF signal modulated into the optical domain including the multiple optical channels.

12 Claims, 5 Drawing Sheets

(56) References Cited

U.S. PATENT DOCUMENTS

| | | | |
|---|---|---|---|
| 8,750,717 B1 * | 6/2014 | Yap | G02F 2/02 398/163 |
| 8,786,930 B2 * | 7/2014 | Kuo | G02F 1/3534 385/24 |
| 8,787,767 B2 * | 7/2014 | Wilkinson | H04B 10/548 398/140 |
| 8,947,766 B2 | 2/2015 | Chen et al. | |
| 9,252,840 B2 | 2/2016 | Watanabe | |
| 9,525,489 B2 * | 12/2016 | Schuetz | H04B 1/16 |
| 10,411,810 B2 * | 9/2019 | Kuo | H04B 10/616 |
| 10,454,523 B1 * | 10/2019 | Kim | H04B 1/7136 |
| 10,498,453 B2 * | 12/2019 | Kuse | H04J 14/02 |
| 10,523,329 B2 * | 12/2019 | Esman | H04B 10/697 |
| 10,547,280 B2 | 1/2020 | Fok et al. | |
| 10,564,248 B1 | 2/2020 | Simons et al. | |
| 11,356,173 B2 * | 6/2022 | Esman | H04B 10/00 |
| 11,480,847 B1 * | 10/2022 | Richardson | H01S 3/0092 |
| 2009/0067843 A1 * | 3/2009 | Way | H04J 14/0246 398/43 |
| 2013/0051807 A1 * | 2/2013 | Huang | H04B 10/25754 398/118 |
| 2015/0372447 A1 * | 12/2015 | Song | H01S 3/0085 372/21 |
| 2019/0090726 A1 | 3/2019 | Park et al. | |

\* cited by examiner

PHOTONIC MULTI-BAND FILTER AND METHOD OF OPERATING SAME

CROSS-REFERENCE TO RELATED APPLICATIONS

This application claims priority under 35 U.S.C. § 119 to Korean Patent Application No. 10-2022-0026868 filed on Mar. 2, 2022 and 10-2022-0146032 filed on Nov. 4, 2022, in the Korean Intellectual Property Office, the disclosures of which are incorporated by reference herein in their entireties.

BACKGROUND

1. Field of the Invention

Embodiments of the present disclosure described herein relate to a photonic multi-band filter and a method of operating the same, and more particularly, relate to a photonic multi-band filter for generating a high-frequency multi-band by using a single optical frequency comb, and a method of operating the same.

2. Description of Related Art

A communication system currently in use is mainly constructed around a frequency band of several GHz or less, so that services may be provided with only general RF components. However, because 5G or 6G or next communication generations must use a frequency band having a band of tens or hundreds of GHz or higher, convergence with optical communication may be required. In addition, hardware solutions for data combining between different frequency bands, frequency shifting, and data transmission of T bps or higher may be required.

A filter, which is one of the cores of communication network hardware, is one of the representative 2-port elements that transmits and processes signals, and performs a function of filtering and extracting some of signal components or blocking noise or signals of undesired frequency bands. A communication system implemented without using a filter may not remove noise, thereby reducing the quality of a demodulated signal, or causing interference with other signals to cause loss of information in the signal, which may deteriorate service quality.

A mobile and data communication system required to enable communication between many users within a limited bandwidth may determine the quality of service through the number of passbands and response characteristics of filters. In order to process a large amount of information generated through various services in real time, a hardware solution that covers multiple high-frequency bands and enables data combination between homogeneous and heterogeneous bands, such as a hyper-connected network, may be required.

To this end, a scheme of simultaneously transmitting and processing signals of several bands using a tunable multi-band filter after securing a frequency band having a high-frequency and a wide bandwidth has been proposed as one solution.

However, because a scheme implemented with a single band filter using a single wavelength light source requires combining several single band filters operating in different frequency bands, it may be difficult to correct a phase difference of a signal. In addition, a scheme of combining several wavelength-locked light sources through an optical multiplexer may be difficult to change filter performance due to a limited number of optical spectrum lines.

SUMMARY

Embodiments of the present disclosure provide a photonic multi-band filter and a method of operating the same which can generate a plurality of passbands through amplitude shaping based on a single optical frequency comb, and adjust the center frequency of each passband through linear phase shaping to generate a high-frequency tunable multi-band.

According to an embodiment, a photonic multiband filter includes an optical frequency comb that forms multiple optical channels based on a single light source incident from an outside, a modulator that applies an RF signal modulated into an optical domain among a plurality of RF signals to the multiple optical channels, and a pulse shaper that determines a center frequency, a bandwidth, and a passband shape of the RF signal modulated into the optical domain including the multiple optical channels.

According to an embodiment, the pulse shaper may include a phase adjuster, wherein the phase adjuster may adjust the center frequency of the RF signal modulated into the optical domain based on a channel spacing between the multiple optical channels.

According to an embodiment, the phase adjuster may operate based on a linear phase shaping coefficient, wherein the phase adjuster may increase the center frequency of the RF signal modulated into the optical domain as a value of the linear phase shaping coefficient and a value of the channel spacing increase.

According to an embodiment, the phase adjuster may operate based on a linear phase shaping coefficient, wherein the phase adjuster may decrease the center frequency of the RF signal modulated into the optical domain as a value of the linear phase shaping coefficient and a value of the channel spacing decrease.

According to an embodiment, the pulse shaper may include an amplitude adjuster, wherein the amplitude adjuster may determine the bandwidth of the RF signal modulated into the optical domain and the passband shape according to a size and a shape of each of the multiple optical channels.

According to an embodiment, a size of the bandwidth of the RF signal modulated into the optical domain may decrease as a size of a window function of each of the multiple optical channels increases.

According to an embodiment, a number of passbands of the RF signal modulated into the optical domain may increase as a number of window functions of the optical frequency comb increases.

According to another embodiment, a method of operating a photonic multiband filter includes forming, by an optical frequency comb, multiple optical channels based on a single light source incident from an outside, applying, by a modulator, an RF signal modulated into an optical domain among a plurality of RF signals to the multiple optical channels, determining, by a pulse shaper, a bandwidth and a passband shape of each of the multiple optical channels, and adjusting, by the pulse shaper, a center frequency of each of the multiple optical channels having different bandwidths and a passband shape.

According to an embodiment, the pulse shaper may include a phase adjuster, wherein the adjusting of the center frequency may include adjusting, by the phase adjuster, the center frequency of the RF signal modulated into the optical domain based on a channel spacing between the multiple optical channels.

According to an embodiment, the phase adjuster may operate based on a linear phase shaping coefficient, wherein the adjusting of the center frequency may include increasing, by the phase adjuster, the center frequency of the RF signal modulated into the optical domain as a value of the linear phase shaping coefficient and a value of the channel spacing increase.

According to an embodiment, the phase adjuster may operate based on a linear phase shaping coefficient, wherein the adjusting of the center frequency may include decreasing, by the phase adjuster, the center frequency of the RF signal modulated into the optical domain as a value of the linear phase shaping coefficient and a value of the channel spacing decrease.

According to an embodiment, the pulse shaper may include an amplitude adjuster, wherein the determining of the bandwidth and the passband shape may include determining, by the amplitude adjuster, the passband shape of the RF signal modulated into the optical domain and the bandwidth according to a size and a shape of each of the multiple optical channels.

According to an embodiment, a size of the bandwidth of the RF signal modulated into the optical domain may decrease as a size of a window function of each of the multiple optical channels increases.

According to an embodiment, a number of passbands of the RF signal modulated into the optical domain may increase as a number of window functions of the optical frequency comb increases.

According to the embodiments of the present disclosure, the photonic multi-band filter and the method of operating the same may form a high-frequency multi-band band by using a single optical frequency comb and a pulse shaper. Accordingly, the photonic multi-band filter may reduce the size of the filter and enable high-speed frequency tuning by simultaneously shaping the amplitude and phase with a pulse shaper.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described clearly and in detail so that those skilled in the art can easily carry out embodiments of the present disclosure.

Figure 1:
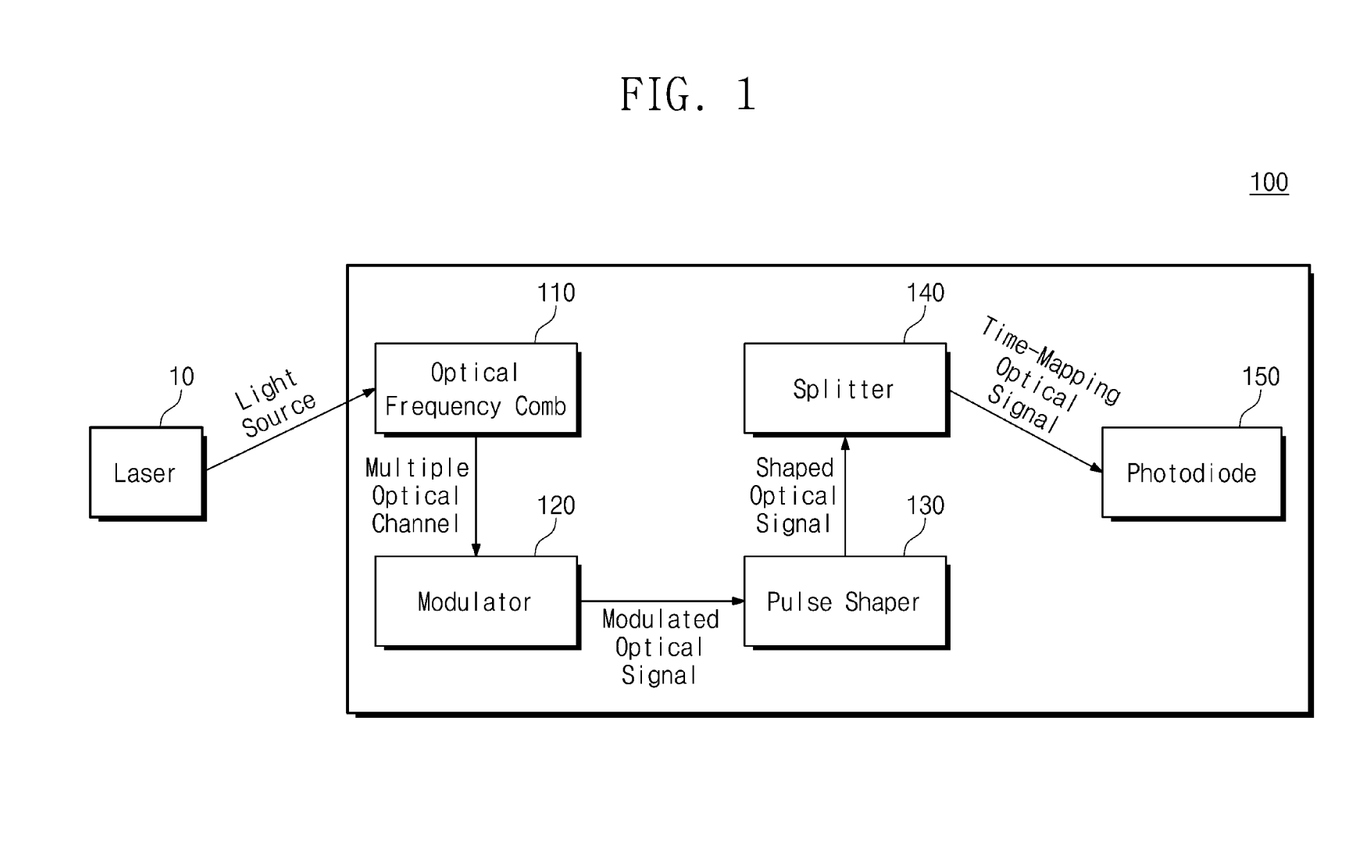
FIG. 1 is a block diagram illustrating a photonic multi-band filter according to an embodiment of the present disclosure.

FIG. 1 is a block diagram illustrating a photonic multi-band filter 100 according to an embodiment of the present disclosure. Referring to FIG. 1, the photonic multi-band filter 100 may include an optical frequency comb 110, a modulator 120, a pulse shaper 130, a splitter 140, and a photodiode 150.

The photonic multi-band filter 100 may be a microwave photonic filter. The photonic multi-band filter 100 may be a digital filter having a finite impulse response. However, the photonic multi-band filter 100 is not limited thereto and may include all filters capable of forming the finite number of optical channels.

The optical frequency comb 110 may be one optical frequency comb or more. The optical frequency comb 110 may include an optical modulator (not shown) therein. The optical frequency comb 110 may generate a finite number of multiple optical channels having the same channel spacing through an optical modulator (not shown) based on a light source incident from the outside. However, the embodiment is not limited thereto, and channel spacing between multiple optical channels may be different.

A light source incident from the outside may be a single light source incident through a laser 10. However, the embodiment is not limited thereto, and the light source incident from the outside may be one or more multiple light sources.

Hereinafter, embodiments of the present disclosure will be described based on that the optical frequency comb 110 is one optical frequency comb that forms multiple optical channels having the same channel spacing based on a single light source incident through the laser 10.

The modulator 120 may be a device for converting digital data into an analog signal. The modulator 120 may be a device for converting information about an input signal into an electrical signal for storage and transmission.

In the present specification, the modulator 120 may be a device for modulating an RF signal into an optical signal. The modulator 120 may apply an optical signal to multiple optical channels formed by the optical frequency comb 110. The optical signal may be a signal obtained by modulating an RF signal to be filtered among a plurality of RF signals into an optical domain.

The channel spacing between multiple optical channels may be determined based on a clock frequency of an RF signal. As the value of the clock frequency of the RF signal increases, the value of the channel spacing between multiple optical channels may increase.

The pulse shaper 130 may be a device for shaping the amplitude and phase of an optical signal including multiple optical channels. The pulse shaper 130 may receive the modulated optical signals every time the modulator 120 modulates the RF signal to be filtered into the optical domain, and shape the amplitude and phase of each optical signal.

For example, the pulse shaper 130 may shape the amplitude and phase of a first optical signal obtained by modulating a first RF signal to be filtered. The pulse shaper 130 may shape the amplitude and phase of a second optical signal obtained by modulating a second RF signal different from the first RF signal. The pulse shaper 130 may shape the second optical signal separately from the first optical signal. The details of a configuration in which the pulse shaper 130 shapes the amplitude and phase of the optical signal will be described later.

The splitter 140 may frequency-to-time map a pulse-shaped optical signal in the frequency domain to the time domain. The splitter 140 may map each of the signals having a constant frequency band and amplitude at different time points.

For example, the splitter 140 may map a first signal having a frequency band of 1 GHz and a Gaussian window of a specific coefficient to a first time point. The splitter 140 may map a second signal having a frequency band of 2 GHz and a Gaussian window of a specific coefficient to a second time point.

The photodiode 150 may be a device for converting light energy into electrical energy. The photodiode 150 may be a device for converting one electromagnetic wave or more into electrical signals.

In the present specification, the photodiode 150 may be a component for demodulating a microwave-based optical signal among radio waves into an RF signal which is an electrical signal. However, as mentioned above, the optical signal whose amplitude and phase are shaped is not limited to microwaves, but may include all electromagnetic waves.

Figure 2:
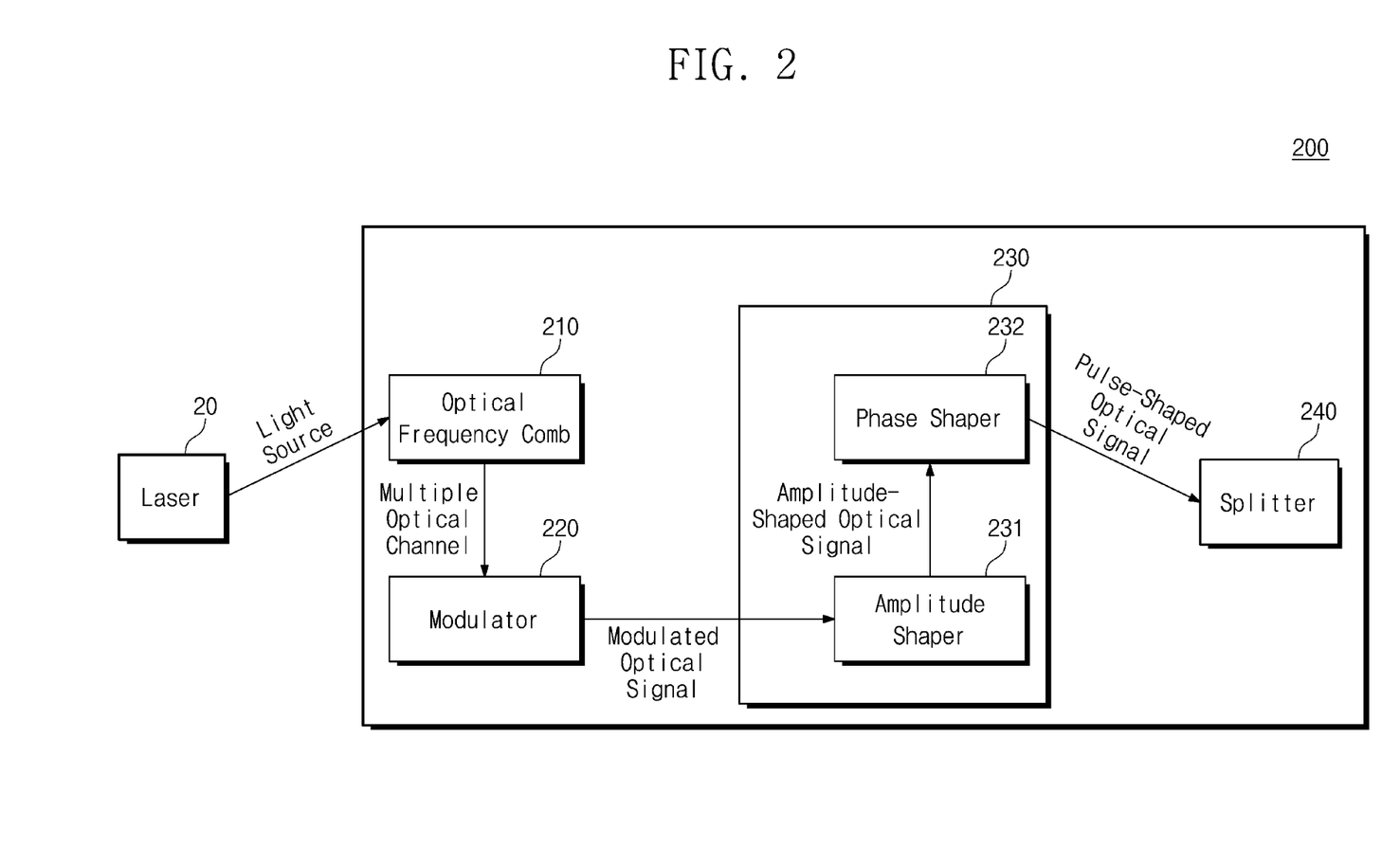
FIG. 2 is a block diagram illustrating in detail a pulse shaper included in a photonic multi-band filter.

FIG. 2 is a block diagram illustrating in detail a pulse shaper 230 included in a photonic multi-band filter 200. As an example, an optical frequency comb 210, a modulator 220, the pulse shaper 230, a splitter 240, and a laser 20 of FIG. 2 may correspond to the optical frequency comb 110, the modulator 120, the pulse shaper 130, the splitter 140, and the laser 10. Accordingly, redundant descriptions of similar components and similar operations related thereto will be omitted.

Referring to FIG. 2, the pulse shaper 230 may include an amplitude shaper 231 and a phase shaper 232. The amplitude shaper 231 may be a device for receiving an optical signal from the modulator 220 and shaping the amplitude. The amplitude shaping may mean determining a bandwidth and a shape of a passband of each of multiple optical channels included in an optical signal.

The amplitude shaper 231 may generate an amplitude-shaped optical signal having a different passband bandwidth and shape for each of the multiple optical channels based on the optical signal received from the modulator 220. The details of the amplitude-shaped optical signal will be described later with reference to FIG. 4.

When receiving a plurality of optical signals from the modulator 220, the amplitude shaper 231 may perform a plurality of amplitude shaping operations. For example, the amplitude shaper 231 may perform a first amplitude shaping for the first optical signal modulated by the modulator 220. The amplitude shaper 231 may perform a second amplitude shaping for the second optical signal modulated by the modulator 220.

The phase shaper 232 may be a device for receiving and phase shaping the amplitude-shaped optical signal from the amplitude shaper 231. The phase shaping may mean determining a center frequency of each of multiple optical channels included in an amplitude-shaped optical signal.

The phase shaper 232 may generate phase-shaped optical signals having different center frequencies for the multiple optical channels based on the amplitude-shaped optical signal received from the amplitude shaper 231. The phase shaper 232 may determine the center frequency of each of the multiple optical channels based on a linear phase shaping coefficient.

The phase shaper 232 may determine the center frequency of each of the multiple optical channels based on the channel spacing between the multiple optical channels as well as the linear phase shaping coefficient. The details of the phase-shaped optical signal will be described later with reference to FIG. 5.

The phase shaper 232 may perform a plurality of phase shaping operations when receiving a plurality of amplitude-shaped optical signals from the amplitude shaper 231. The phase shaper 232 may perform first phase shaping for the first amplitude-shaped optical signal output from the amplitude shaper 231. The phase shaper 232 may perform second phase shaping for the second amplitude-shaped optical signal output from the amplitude shaper 231.

The splitter 240 may receive an optical signal whose amplitude and phase are shaped from the phase shaper 232. The splitter 240 may map the pulse-shaped (amplitude and phase-shaped) optical signal in the frequency domain to the time domain.

Figure 3:
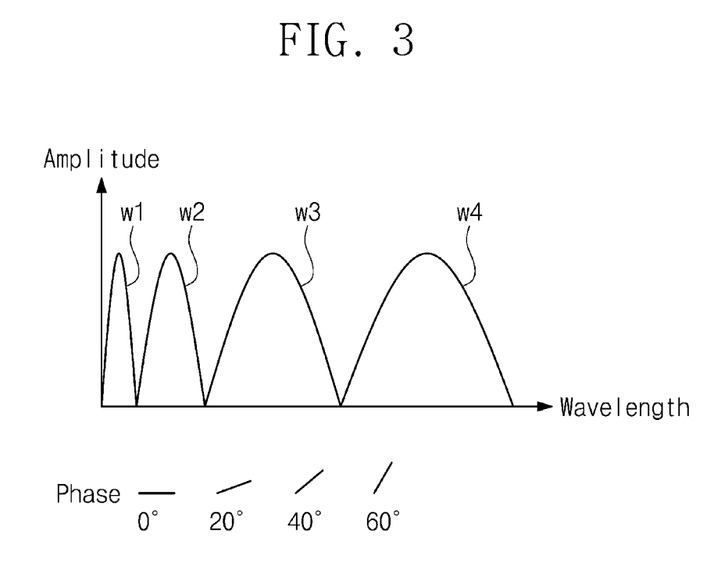
FIG. 3 illustrates an embodiment in which the size of each of multiple optical channels is changed by an amplitude shaper.

FIG. 3 illustrates an embodiment in which the size of each of multiple optical channels is changed by an amplitude shaper. As an example, although FIG. 3 illustrates only the window function graph of each of the four multi-optical channels (first to fourth optical channels) is shown, the embodiment is not limited thereto, and the optical frequency comb may include five multi-optical channels or more.

Referring to FIGS. 2 and 3, the optical frequency comb 210 may include four optical channels. As the size of the single optical frequency comb 210 increases, the number of optical channels included in the optical frequency comb 210 may increase, and the number of passbands formed through amplitude shaping may increase. The number of optical channels may correspond to the number of window functions.

The amplitude shaper 231 may receive an optical signal from the modulator 220 and amplitude shape four optical channels (a first to a fourth optical channel) included in the optical signal.

The first window function of the first optical channel may be a function having a first wavelength w1. The second window function of the second optical channel may be a function having a second wavelength w2. The third window function of the third optical channel may be a function having a third wavelength w3. The fourth window function of the fourth optical channel may be a function having a fourth wavelength w4.

For example, in FIG. 3, the size of the first window function may be smaller than those of the second to fourth window functions. The size of the second window function may be larger than that of the first window function and smaller than those of the third and fourth window functions.

The size of the third window function may be greater than the sizes of the first and second window functions and may be smaller than the size of the fourth window function. The size of the fourth window function may be greater than those of the first to third window functions.

However, the size of each of the first to fourth window functions shown in FIG. 3 is only an example. Accordingly, the first to fourth window functions may have the same size or different sizes in a manner different from that shown in FIG. 3.

The size of a window function according to amplitude shaping and the bandwidth and shape of each passband of multiple optical channels may have a Fourier transform relationship. For example, a Gaussian window function may form a Gaussian passband through Fourier transformation. Alternatively, a sync window function may form a rectangular passband through Fourier transformation.

The present specification describes the relationship between a Gaussian window function and a Gaussian passband. The details of the size of the Gaussian window function and the bandwidth and shape of the Gaussian passband will be described later with reference to FIG. 4.

After the amplitude shaper 231 performs amplitude shaping, the phase shaper 232 may perform phase shaping based on the linear phase coefficients different inclinations (e.g., 0°, 20°, 40° and 60°) for each of the first to fourth optical channels. The details of a configuration in which the phase shaper 232 performs phase shaping will be described later with reference to FIG. 5.

Figure 4:
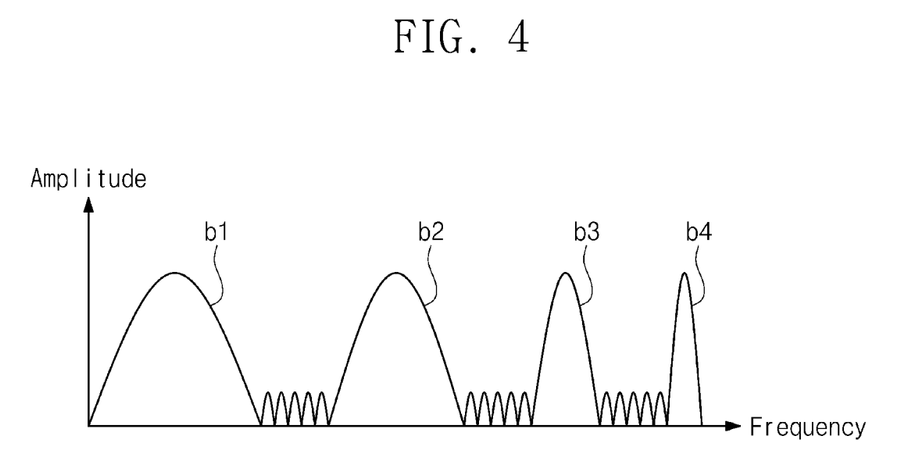
FIG. 4 is a diagram illustrating an embodiment in which an optical signal is amplitude-shaped by an amplitude shaper.

FIG. 4 is a diagram illustrating an embodiment in which an optical signal is amplitude-shaped by an amplitude shaper. As an example, although FIG. 4 illustrates only the first to fourth bandwidths b1 to b4 respectively corresponding to the first to fourth window functions of FIG. 3, the embodiment is not limited thereto, and the optical frequency comb has five bandwidths or more.

For example, in FIG. 4, the first bandwidth b1 may be greater than the second to fourth bandwidths b2 to b4. The second bandwidth b2 may be smaller than the first bandwidth b1 and larger than the third and fourth bandwidths b3 and b4.

The third bandwidth b3 may be smaller than the first and second bandwidths b1 and b2 and larger than the fourth bandwidth b4. The fourth bandwidth b4 may be smaller than the first to third bandwidths b1 to b3.

As described above, the bandwidth of the passband of each of the multiple optical channels and the size of the window function of each of the multiple optical channels may be in inverse proportion to each other by a Fourier transform relationship. Therefore, as the size of the window function increases, the size of the bandwidth may decrease.

For example, the first bandwidth b1 may be obtained by Fourier transforming the first window function. The second bandwidth b2 may be obtained by Fourier transforming the second window function. The third bandwidth b3 may be obtained by Fourier transforming the third window function. The fourth bandwidth b4 may be obtained by Fourier transforming the fourth window function.

The passband shape may be shaped according to the bandwidth of the passband. For example, the passband may have a shape of a broad quadratic function curve as the bandwidth of the passband increases.

For example, the passband having the first bandwidth b1 may have a first shape, the passband having the second bandwidth b2 may have a second shape, the passband having the third bandwidth b3 may have a third shape, and the passband having the fourth bandwidth b4 may have a fourth shape.

Figure 5:
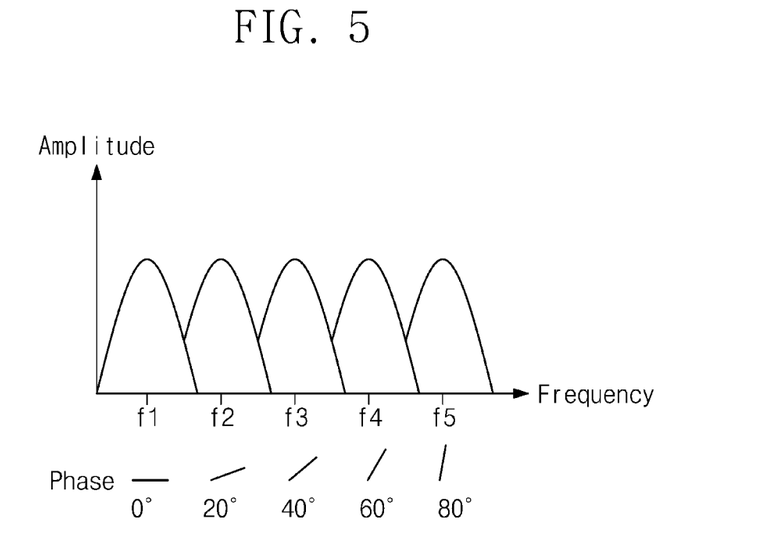
FIG. 5 is a diagram showing an embodiment in which an optical signal is phase-shaped by a phase shaper.

FIG. 5 is a diagram showing an embodiment in which an optical signal is phase-shaped by a phase shaper. As an example, although FIG. 5 illustrates only the center frequencies f1 to f5 of the five multi-optical channels (first to fifth optical channels), the embodiment is not limited thereto, and the optical frequency comb may include six multiple optical channels or more.

Referring to FIGS. 2 and 5, the phase shaper 232 may receive an amplitude-shaped optical signal from the amplitude shaper 231 and may phase-shape five optical channels (first to fifth optical channels) included in the amplitude-shaped optical signal. The amplitude-shaped optical signal may be an optical signal amplitude-shaped by the amplitude shaper 231 in FIGS. 3 and 4.

The phase shaper 232 may perform phase shaping operations based on linear phase coefficients of different inclinations (0, 20°, 40°, 60° and 80°) for each of the first to fifth optical channels.

In a differential relationship between the linear phase and the degree of delay, a linear phase shaping coefficient having a slope of a linear function may form a delay of a constant value. Accordingly, the phase shaper 232 may perform phase shaping based on different linear phase shaping coefficients, and may form delays having different values. The phase shaper 232 may determine the location of the center frequency of each optical channel by varying the delay of each optical channel.

Alternatively, the phase shaper 232 may perform phase shaping operations based on a linear phase shaping coefficient and a channel spacing between multiple optical channels. The phase shaper 232 may determine a higher center frequency of the passband as the value of the channel spacing between the multiple optical channels increases.

For example, the phase shaper 232 may shape the first optical channel to have a first center frequency f1 based on a first linear phase coefficient having a slope of 0 and a first channel spacing (not shown).

The phase shaper 232 may shape the second optical channel to have a second center frequency f2 based on a second linear phase coefficient having a slope of 20° and a second channel spacing (not shown) greater than the first channel spacing.

The phase shaper 232 may shape the third optical channel to have a third center frequency f3 based on a third linear phase coefficient having a slope of 40° and a third channel spacing (not shown) greater than the second channel spacing.

The phase shaper 232 may shape the fourth optical channel to have a fourth center frequency f4 based on a fourth linear phase coefficient having a slope of 60° and a fourth channel spacing (not shown) greater than the third channel spacing.

The phase shaper 232 may shape the fifth optical channel to have a fifth center frequency f5 based on a fifth linear phase coefficient having a slope of 80° and a fifth channel spacing (not shown) greater than the fourth channel spacing.

Figure 6:
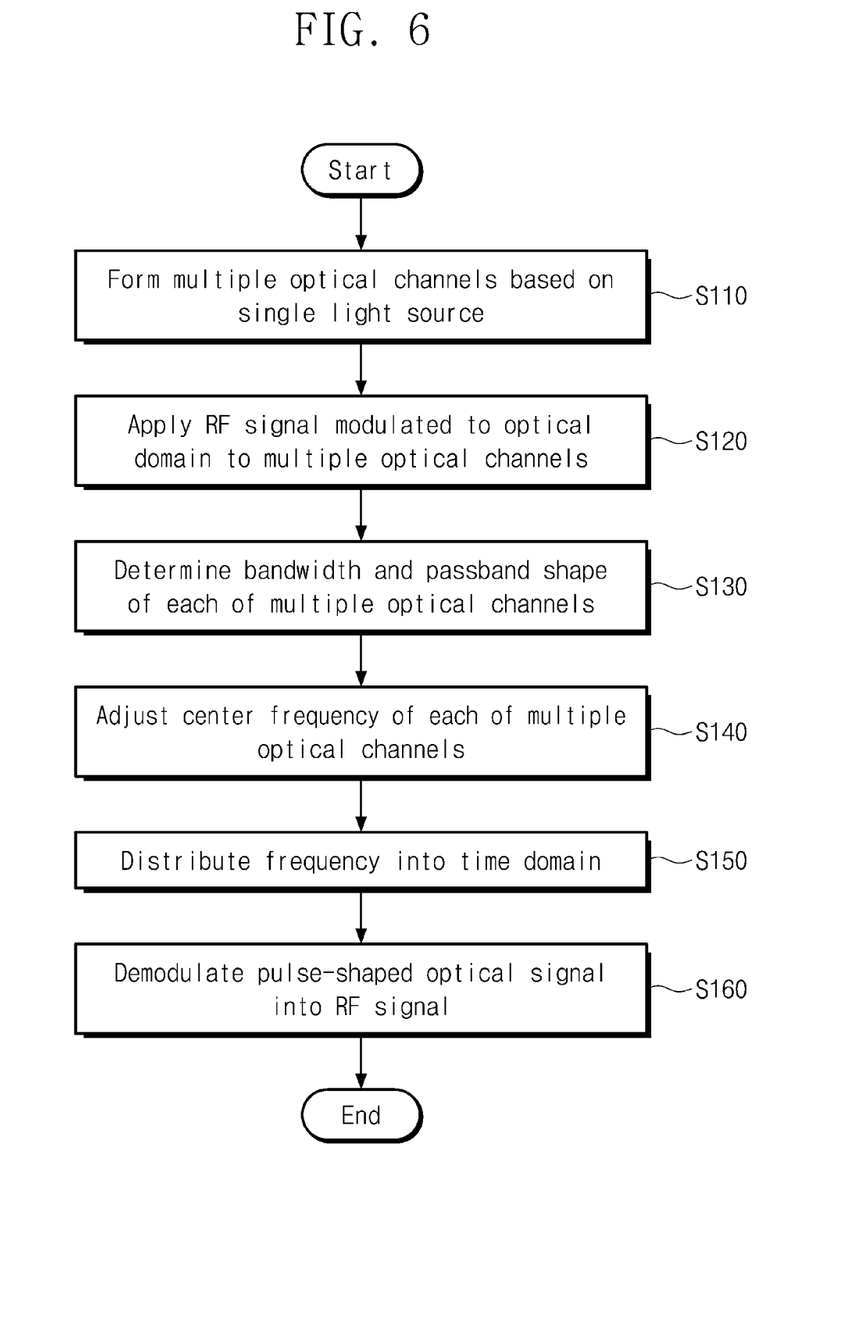
FIG. 6 is a flowchart illustrating a method of operating a photonic multi-band filter according to an embodiment of the present disclosure.

FIG. 6 is a flowchart illustrating a method of operating a photonic multi-band filter according to an embodiment of the present disclosure.

Referring to FIGS. 1, 2 and 6, in operation S110, the optical frequency combs 110 and 210 may form multiple optical channels through an optical modulator (not shown) based on a single light source incident from the lasers 10 and 20. The multiple optical channels may include first to n-th optical channels (where n is a natural number equal to or greater than 2).

In operation S120, the modulators 120 and 220 may apply the RF signal modulated to the optical domain to the multiple optical channels. As the value of the clock frequency of the RF signal increases, the value of the channel spacing between the multiple optical channels may increase.

In operation S130, the amplitude shaper 231 included in the pulse shapers 130 and 230 may determine the bandwidth and pass band shape of each of the multiple optical channels. As mentioned above, the amplitude shaper 231 may perform amplitude shaping operations when receiving optical signals from the modulators 120 and 220, and the passband shape may vary according to the bandwidth of each of the multiple optical channels.

In operation S140, the phase shaper 232 included in the pulse shapers 130 and 230 may adjust the center frequency of each of the multiple optical channels. In this case, the multiple optical channels may be channels included in an optical signal amplitude-shaped by the amplitude shaper 231. As described above, the phase shaper 232 may perform phase shaping operations when receiving the amplitude-shaped optical signal from the amplitude shaper 231.

In operation S150, the splitters 140 and 240 may map pulse-shaped (amplitude-shaping and phase-shaping) optical signals from a frequency domain to a time domain. In this case, the splitters 140 and 240 may time-map each optical channels in the frequency domain included in the optical signal through linear dispersion based on the bandwidth and magnitude of the pulse-shaped optical signal.

In operation S160, the photodiode 150 may demodulate the pulse-shaped optical signal into the RF signal. The photonic multi-band filters 100 and 200 may operate as periodic filters whose amplitude and phase are programmed based on the demodulated RF signal.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A photonic multiband filter comprising:
    an optical frequency comb configured to form multiple optical channels based on a single light source incident from an outside;
    a modulator configured to apply an RF signal modulated into an optical domain among a plurality of RF signals to the multiple optical channels; and
    a pulse shaper configured to determine a center frequency, a bandwidth, and a passband shape of the RF signal modulated into the optical domain including the multiple optical channels,
    wherein the pulse shaper includes an amplitude adjuster, and
    wherein the amplitude adjuster is configured to determine the bandwidth of the RF signal modulated into the optical domain and the passband shape according to a size and a shape of each of the multiple optical channels.

2. The photonic multiband filter of claim 1, wherein the pulse shaper includes a phase adjuster, and
    wherein the phase adjuster is configured to adjust the center frequency of the RF signal modulated into the optical domain based on a channel spacing between the multiple optical channels.

3. The photonic multiband filter of claim 2, wherein the phase adjuster is configured to operate based on a linear phase shaping coefficient, and
    wherein the phase adjuster is configured to increase the center frequency of the RF signal modulated into the optical domain as a value of the linear phase shaping coefficient and a value of the channel spacing increase.

4. The photonic multiband filter of claim 2, wherein the phase adjuster is configured to operate based on a linear phase shaping coefficient, and
    wherein the phase adjuster is configured to decrease the center frequency of the RF signal modulated into the optical domain as a value of the linear phase shaping coefficient and a value of the channel spacing decrease.

5. The photonic multiband filter of claim 1, wherein a size of the bandwidth of the RF signal modulated into the optical domain decreases as a size of a window function of each of the multiple optical channels increases.

6. The photonic multiband filter of claim 1, wherein a number of passbands of the RF signal modulated into the optical domain increases as a number of window functions of the optical frequency comb increases.

7. A method of operating a photonic multiband filter, the method comprising:
    forming, by an optical frequency comb, multiple optical channels based on a single light source incident from an outside;
    applying, by a modulator, an RF signal modulated into an optical domain among a plurality of RF signals to the multiple optical channels;
    determining, by a pulse shaper, a bandwidth and a passband shape of each of the multiple optical channels; and
    adjusting, by the pulse shaper, a center frequency of each of the multiple optical channels having different bandwidths and a passband shape,
    wherein the pulse shaper includes an amplitude adjuster, and
    wherein the determining of the bandwidth and the passband shape includes determining, by the amplitude adjuster, the passband shape of the RF signal modulated into the optical domain and the bandwidth according to a size and a shape of each of the multiple optical channels.

8. The method of claim 7, wherein the pulse shaper includes a phase adjuster, and
    wherein the adjusting of the center frequency includes adjusting, by the phase adjuster, the center frequency of the RF signal modulated into the optical domain based on a channel spacing between the multiple optical channels.

9. The method of claim 8, wherein the phase adjuster is configured to operate based on a linear phase shaping coefficient, and
    wherein the adjusting of the center frequency includes increasing, by the phase adjuster, the center frequency of the RF signal modulated into the optical domain as a value of the linear phase shaping coefficient and a value of the channel spacing increase.

10. The method of claim 8, wherein the phase adjuster is configured to operate based on a linear phase shaping coefficient, and
    wherein the adjusting of the center frequency includes decreasing, by the phase adjuster, the center frequency of the RF signal modulated into the optical domain as a value of the linear phase shaping coefficient and a value of the channel spacing decrease.

11. The method of claim 7, wherein a size of the bandwidth of the RF signal modulated into the optical domain decreases as a size of a window function of each of the multiple optical channels increases.

12. The method of claim 7, wherein a number of passbands of the RF signal modulated into the optical domain increases as a number of window functions of the optical frequency comb increases.

* * * * *